US012595965B2

(12) United States Patent
Son et al.

(10) Patent No.: US 12,595,965 B2
(45) Date of Patent: Apr. 7, 2026

(54) CHILLING UNIT, HEAT TREATMENT APPARATUS INCLUDING SAME, AND HEAT TREATMENT METHOD

(71) Applicant: SEMES CO., LTD., Cheonan-si (KR)

(72) Inventors: Young Jun Son, Cheonan-si (KR); Young Jun Lee, Cheonan-si (KR); Ki Sang Eum, Cheonan-si (KR); Tae Hoon Lee, Osan-si (KR)

(73) Assignee: SEMES CO., LTD., Cheonan-si (KR)

( * ) Notice: Subject to any disclaimer, the term of this patent is extended or adjusted under 35 U.S.C. 154(b) by 178 days.

(21) Appl. No.: 18/083,898

(22) Filed: Dec. 19, 2022

(65) Prior Publication Data

US 2023/0194175 A1 Jun. 22, 2023

(30) Foreign Application Priority Data

Dec. 20, 2021 (KR) ........................ 10-2021-0183023

(51) Int. Cl.
*F27D 9/00* (2006.01)
*F27B 17/00* (2006.01)

(52) U.S. Cl.
CPC ............ *F27D 9/00* (2013.01); *F27B 17/0025* (2013.01); *F27D 2009/0005* (2013.01); *F27D 2009/001* (2013.01); *F27D 2009/0029* (2013.01); *F27D 2009/0051* (2013.01); *F27D 2009/0056* (2013.01)

(58) Field of Classification Search
CPC ......... H01L 21/67069; H01L 21/67103; H01L 21/67248; F27D 9/00; F27D 2009/001; F27D 2009/0051; F27B 17/0125
See application file for complete search history.

(56) References Cited

U.S. PATENT DOCUMENTS

| | | | | |
|---|---|---|---|---|
| 6,474,986 | B2 | 11/2002 | Oda et al. | |
| 2016/0035601 | A1* | 2/2016 | Eum | H01L 21/67748 432/9 |

FOREIGN PATENT DOCUMENTS

| | | | | | |
|---|---|---|---|---|---|
| CN | 101593673 | | | 12/2009 | |
| CN | 105321853 | | | 2/2016 | |
| JP | 2013048144 | A | * | 3/2013 | H01L 21/67748 |
| JP | 2013145916 | A | * | 7/2013 | |
| KR | 10-2001-0021257 | | | 3/2001 | |
| KR | 10-2012-0034555 | | | 4/2012 | |
| KR | 10-2013-0135110 | | | 12/2013 | |
| KR | 20130135110 | A | * | 12/2013 | H01L 21/0273 |
| KR | 10-2016-0017699 | | | 2/2016 | |
| KR | 20190084875 | A | * | 7/2019 | H01L 21/67248 |
| KR | 20200086629 | A | * | 7/2020 | H01L 21/67248 |
| WO | WO-2016104710 | A1 | * | 6/2016 | B23K 3/085 |

OTHER PUBLICATIONS

KR Office Action of Oct. 11, 2023.
Office Action from China National Intellectual Property Administration dated Jul. 12, 2025.

* cited by examiner

*Primary Examiner* — Gregory A Wilson

(57) ABSTRACT

Proposed are a chilling unit, a heat treatment apparatus including same, and a heat treatment method. More particularly, proposed is a technology capable of rapidly and effectively lowering the temperature of a heating plate by bringing a heat exchange medium of a chilling unit into contact with the heating plate and then circulating a refrigerant after performing a heat treatment process of a substrate through a heat treatment apparatus.

15 Claims, 10 Drawing Sheets

100

CHILLING UNIT, HEAT TREATMENT APPARATUS INCLUDING SAME, AND HEAT TREATMENT METHOD

CROSS REFERENCE TO RELATED APPLICATION

The present application claims priority to Korean Patent Application No. 10-2021-0183023, filed Dec. 20, 2021, the entire contents of which is incorporated herein for all purposes by this reference.

BACKGROUND OF THE INVENTION

Field of the Invention

The present disclosure relates generally to a chilling unit, a heat treatment apparatus including same, and a heat treatment method. More particularly, the present disclosure relates to a technology capable of rapidly and effectively lowering the temperature of a heating plate by bringing a heat exchange medium of a chilling unit into contact with the heating plate and then circulating a refrigerant after performing a heat treatment process of a substrate through a heat treatment apparatus.

Description of the Related Art

In general, in order to manufacture a semiconductor device, various processes such as cleaning, deposition, photolithography, etching, and ion implantation are performed. Of these, a photolithography process performed to form a pattern plays a key role in achieving high integration of a semiconductor device.

The photolithography process is performed to form a photoresist pattern on a semiconductor substrate. The photolithography process generally involves a coating process of forming a photoresist film on a substrate; an exposure process of forming a photoresist pattern from a photoresist film; and a development process of removing the area irradiated with light or the opposite area in the exposure process. A bake process of heating and cooling the substrate is performed before and after each process.

In the bake process, the substrate is heated through a heat treatment unit. The heat treatment unit has a heating plate on which a wafer is placed. After the process is completed for wafers belonging to one group and before proceeding to wafers belonging to the next group, the temperature of the heating plate needs to be adjusted to suit the processing conditions (e.g., heating temperature) of the wafers belonging to the next group described above. Increasing the temperature of the heating plate can be performed rapidly by increasing thermal energy provided to the heating plate.

However, lowering the temperature of the heating plate is achieved by a natural cooling method, and thus takes a lot of time. The time required by the natural cooling method corresponds to standby time, resulting in a significant reduction in the operating rate of the entire facility.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and an objective of the present disclosure is to provide a method of improving the cooling rate of a heating plate of a heat treatment apparatus.

In particular, the present disclosure is intended to solve a problem in which a large amount of time is required to lower the temperature of a heating plate of a heat treatment unit through a natural cooling method, resulting in a significant reduction in the operating rate of the entire facility.

The objectives of the present disclosure is not limited to those mentioned above, and other objectives not mentioned and advantages of the present disclosure will be clearly understood from the following description.

In order to achieve the above objective, according to one aspect of the present disclosure, there is provided a chilling unit including: a chilling plate configured to be moved toward a heating plate of a heating unit configured to perform a heat treatment process on a substrate; a refrigerant flow path provided in the chilling plate and configured to allow a refrigerant to flow therethrough; and a heat exchange medium configured to cool the heating plate in contact with at least a portion of the heating plate through heat exchange between the heating plate and the refrigerant in the refrigerant flow path.

Preferably, the heat exchange medium may include a cooling pin disposed on a lower surface of the chilling plate and having a predetermined level of thermal conductivity.

More preferably, the cooling pin may be configured such that an upper portion of the cooling pin partially protrudes into the refrigerant flow path to make direct contact with the refrigerant flowing in the refrigerant flow path.

As an example, the heat exchange medium may further include a ball plunger in which a lower portion of the cooling pin is partially inserted and configured to make contact with the heating plate.

Preferably, the ball plunger may be made of a material having a predetermined level of thermal conductivity and having elasticity.

As another example, the heat exchange medium may further include a heat conduction pad in which a lower portion of the cooling pin is inserted and configured to make contact with the heating plate.

Preferably, the heat conduction pad may be made of a material having a predetermined level of thermal conductivity and having elasticity.

As an example, the heat conduction pad may be formed with an area corresponding to a shape of the lower surface of the chilling plate.

As another example, the heat conduction pad may be formed with a predetermined area, the heat conduction pad may include a plurality of heat conduction pads, and the heat conduction pads may be distributedly arranged on the lower surface of the chilling plate.

In addition, the chilling unit may further include an actuating means configured to move the chilling plate in horizontal and vertical directions to bring the heat exchange medium into contact with the heating plate.

According to another aspect of the present disclosure, there is provided a heat treatment apparatus including: a housing providing an inner space in which a heat treatment process is performed on a substrate; a heating unit disposed in the inner space of the housing and configured to perform a heat treatment process by heating the substrate to a set temperature; a transfer unit configured to transfer the substrate in the inner space of the housing; the above-described chilling unit configured to cool the heating unit; and a controller configured to control operation of the heating unit, the transfer unit, and the chilling unit.

Preferably, the heating unit may include: a heating plate in which a heating means is disposed and configured to perform a heat treatment process on the substrate; and a cover positioned above the heating plate and configured to be movable in a vertical direction toward the heating plate to provide a heating space.

Furthermore, the transfer unit may include: a transfer plate configured to allow a substrate to be seated thereon; an arm connected to a side of the transfer plate; and an actuating member configured to move the arm to move the transfer plate in horizontal and vertical directions.

As an example, the chilling plate of the chilling unit may be integrated with the transfer plate of the transfer unit.

As another example, the chilling unit may be disposed on a lower surface of the transfer plate of the transfer unit.

In addition, the heating unit may further include a temperature control plate positioned below the heating plate so as to be spaced apart from the heating plate, and configured to discharge gas toward a lower surface of the heating plate.

According to still another aspect of the present disclosure, there is provided a heat treatment method including: a chilling unit moving step of moving a chilling unit to above a heating plate in a state in which a temperature of the heating plate of a heating unit is increased by performing a heat treatment process on a substrate; a heating plate cooling step of lowering the chilling unit to bring a heat exchange medium of the chilling unit into contact with an upper surface of the heating plate and then cooling the heating plate; and a chilling unit returning step of returning the chilling unit to an original position thereof.

As an example, the heating plate cooling step may include: a heat exchange medium contact step of lowering the chilling plate of the chilling unit toward the heating plate to bring the heat exchange medium of the chilling unit into contact with the upper surface of the heating plate; and a heat exchange step of cooling the heating plate through heat exchange between the heat exchange medium and the heating plate by providing a refrigerant through a refrigerant flow path of the chilling unit.

In addition, the heat treatment method may further include a step of supplying a cooling gas to a lower surface of the heating plate through a temperature control plate of the heating means.

According to yet another aspect of the present disclosure, there is provided a heat treatment apparatus including: a housing providing an inner space in which a heat treatment process is performed on a substrate; a heating unit including: a heating plate in which a heating means is disposed and configured to perform a heat treatment process on a substrate; and a cover positioned above the heating plate and configured to be movable in a vertical direction toward the heating plate to provide a heating space; a transfer unit configured to transfer the substrate in the inner space of the housing; and a chilling unit including: a chilling plate configured to be moved toward the heating plate of the heating unit configured to perform the heat treatment process on the substrate; a refrigerant flow path provided in the chilling plate and configured to allow a refrigerant to flow therethrough; a cooling pin disposed on a lower surface of the chilling plate, each of which has an upper portion partially protruding into the refrigerant flow path, and having a predetermined level of thermal conductivity; a ball plunger in which a lower portion of the cooling pin is partially inserted, made of a material having a predetermined level of thermal conductivity and having elasticity, and configured to make contact with the heating plate; and an actuating means configured to move the chilling plate in horizontal and vertical directions.

According to the present disclosure as described above, by enabling heat exchange between the refrigerant and the heating plate to be performed more effectively, it is possible to lower the temperature of the heating plate within a short period of time, thereby significantly increasing the operating rate of the entire facility.

In particular, while securing substantial contact force and contact area with the heating plate through the ball plunger or the heat conduction pad with high thermal conductivity and elasticity, the cooling pin performs heat exchange in direct contact with the refrigerant. Thus, it is possible to further increase the cooling rate of the heating plate.

Furthermore, a predetermine distance may be secured between the chilling plate and the heating plate through the cooling pin and the ball plunger. Thus, it is possible to cool the heating plate through the chilling unit even in a situation in which a lift pin protrudes on the heating plate.

The effects of the present disclosure are not limited to those mentioned above, and other effects not mentioned will be clearly understood by those of ordinary skill in the art to which the present disclosure belongs from the following description.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, exemplary embodiments of the present disclosure will be described in detail with reference to the accompanying drawings, but the present disclosure is not limited by these embodiments.

The present disclosure, operational advantages of the present disclosure, and objectives achieved by executing the present disclosure will be, hereinafter, described by exemplifying preferred embodiments of the present disclosure and referring to the exemplified embodiments.

First, terms used herein is for the purpose of describing particular embodiments only and is not intended to be limiting. As used herein, the singular forms “a”, “an”, and “the” are intended to include the plural forms as well, unless the context clearly indicates otherwise. Further, it will be understood that the terms “comprise”, “include”, and/or “have” when used herein, specify the presence of stated features, integers, steps, operations, elements, and/or components, but do not preclude the presence or addition of one or more other features, integers, steps, operations, elements, components, and/or groups thereof.

In the following description, a detailed description of related known configurations or functions may be omitted to avoid obscuring the subject matter of the present disclosure.

The present disclosure provides a technology for rapidly and effectively lowering the temperature of a heating plate by bringing a heat exchange medium of a chilling unit into contact with the heating plate and then circulating a refrigerant after performing a heat treatment process of a substrate through a heat treatment apparatus.

Figure 1:
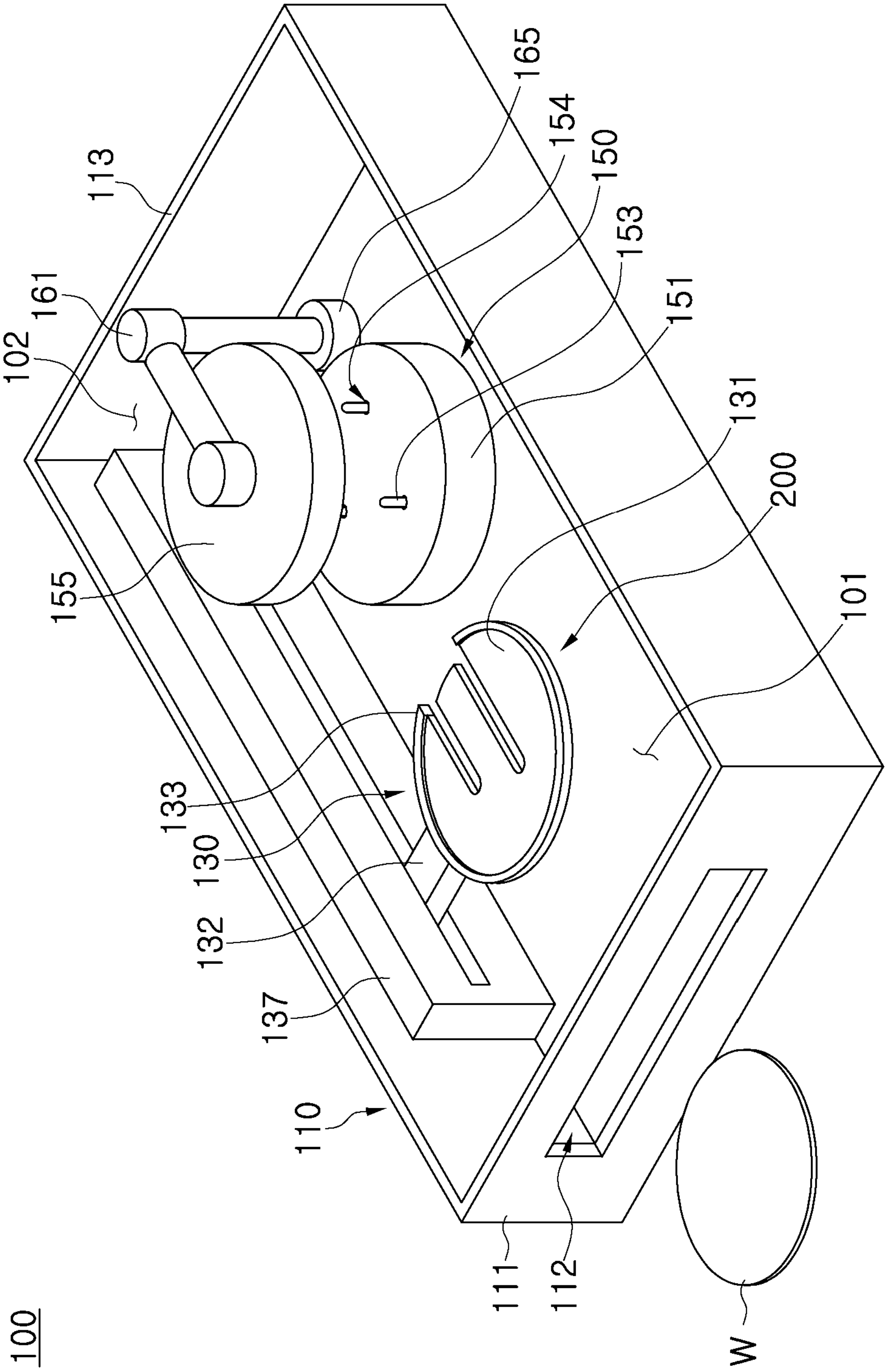
FIGS. 1 to 3 are views illustrating an embodiment of a heat treatment apparatus according to the present disclosure.
Figure 2:
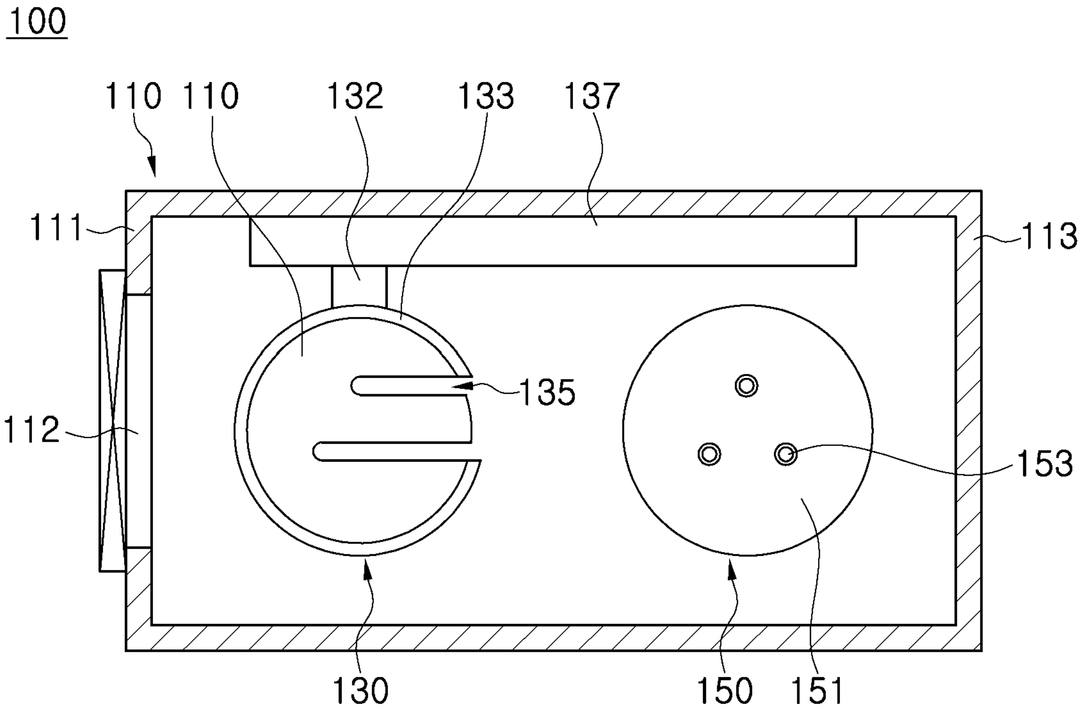
Figure 3:
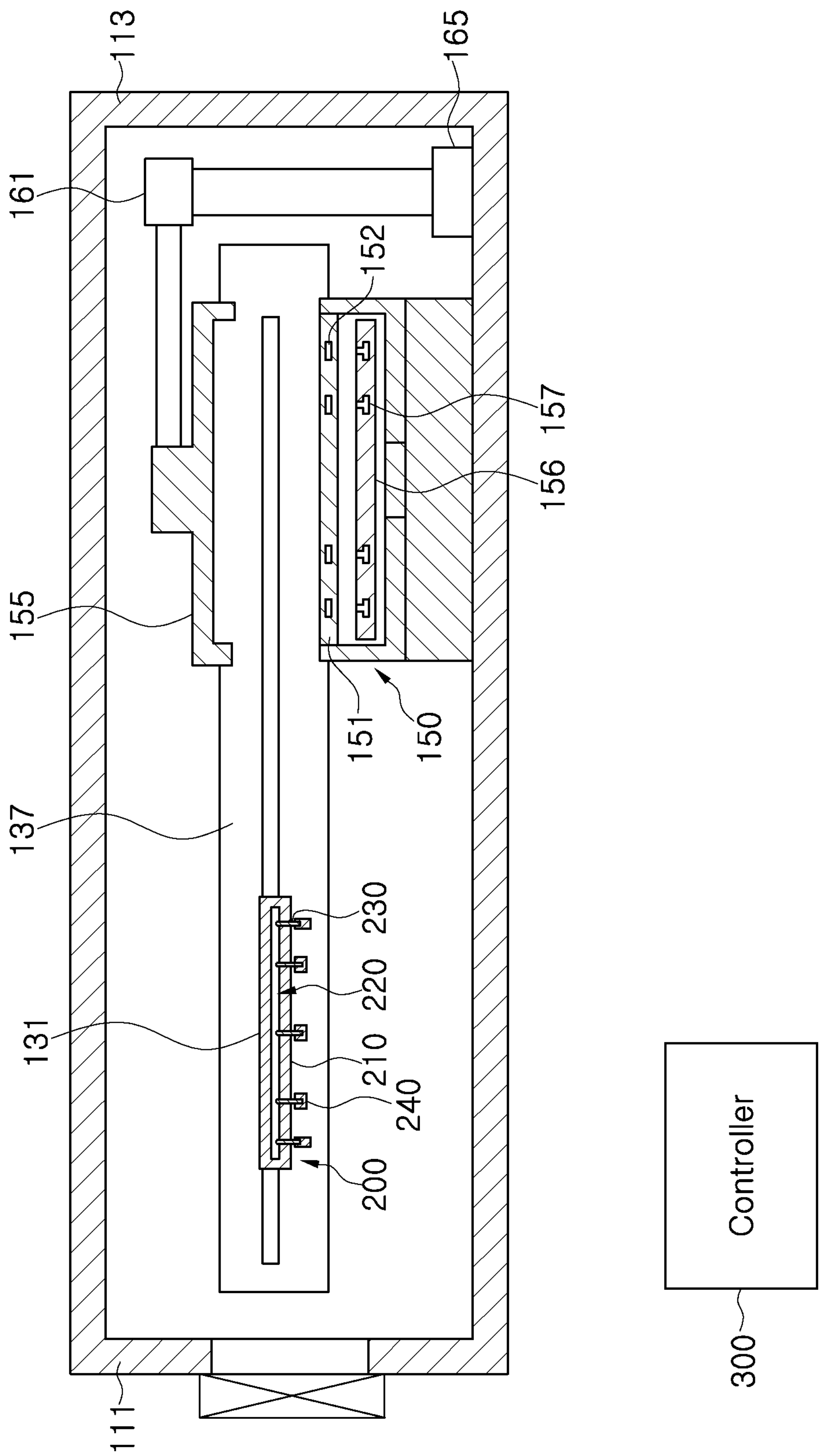

FIGS. 1 to 3 are views illustrating an embodiment of a heat treatment apparatus 100 according to the present disclosure. The embodiment of the heat treatment apparatus according to the present disclosure will be described with reference to FIGS. 1 to 3.

The heat treatment apparatus 100 may perform heat treatment on a substrate W. For example, the heat treatment apparatus 100 may perform a heating process, such as a prebake process in which the substrate W is heated to a predetermined temperature to remove organic matter or moisture from the surface of the substrate W before a photoresist is applied on the substrate W or a soft bake process performed after the photoresist is applied on the substrate W, and then may perform a cooling process of cooling the substrate W after each process.

The heat treatment apparatus 100 may include a housing 110, a transfer unit 130, a heating unit 150, a chilling unit 200, and a controller 300.

The housing 110 may provide an inner space in which a bake process is performed. The housing 110 may be provided in a rectangular parallelepiped shape, and the shape and inner space size of the housing 110 may be modified as necessary.

The housing 110 may include a first side wall 111, a second side wall 113, a loading/unloading passage 112, and the like.

The first side wall 111 may be provided on a side of the housing 110, and the second side wall 113 may be provided on the opposite side of the first side wall 111. The loading/unloading passage 112 for carrying in or carrying out the substrate W therethrough may be formed in a side wall of the housing 110. For example, the loading/unloading passage 112 may be formed in the first side wall 111. The loading/unloading passage 112 may provide a path through which the substrate W is moved.

The transfer unit 130 may transfer the substrate W within the housing 110. The transfer unit 130 may include a transfer plate 131, an arm 132, a support ring 133, an actuating member 137, and the like.

The substrate W may be seated on the transfer plate 131. The transfer plate 131 may be provided in a circular shape, and the shape thereof may be modified as necessary. The transfer plate 131 may be famed to have a size conforming to the substrate W. Preferably, the transfer plate 131 may be made of a metal material having high thermal conductivity.

A guide hole 135 is formed in the transfer plate 131. The guide hole 135 may be provided by extending inwards from an outer surface of the transfer plate 131. The guide hole 135 may be provided so as not to interfere with or collide with a lift pin 153 when the transfer plate 131 is moved.

The arm 132 may be fixedly coupled to the transfer plate 131. The arm 132 may be provided between the transfer plate 131 and the actuating member 137.

The support ring 133 may be provided to surround the transfer plate 131. The support ring 133 may support an outer periphery of the transfer plate 131. The support ring 133 may perform a function of supporting the substrate W so that the substrate W is placed in a correct position when the substrate W is seated on the transfer plate 131.

The actuating member 137 may actuate the transfer plate 131. The actuating member 137 may move the transfer plate 131 in a horizontal or vertical direction. The actuating member 137 may move the transfer plate 131 to a first position 101 and a second position 102.

The first position 101 may be a position where the transfer plate 131 is adjacent to the first side wall 111. The second position 102 may be a position where the transfer plate 131 is adjacent to the second side wall 113 and may be a position above a heating plate 151.

The heating unit 150 may heat the substrate W to a set temperature. The heating unit 150 may include the heating plate 151, the lift pin 153, a cover 155, and an actuator 165, and may further include a temperature control plate 156, depending on situations.

A heating means 152 for heating the substrate W may be disposed inside the heating plate 151. For example, the heating means 152 may be provided as a heating coil. Alternatively, as the heating means 152, heating patterns may be provided on the heating plate 151. The heating plate 151 may be provided in a cylindrical shape, and the shape thereof may be variously modified as necessary. A pin hole 154 for receiving the lift pin 153 may be formed in the heating plate 151.

The pin hole 154 may provide a path through which the lift pin 153 is moved when the lift pin 153 moves the substrate W in the vertical direction. The pin hole 154 may be provided to pass through the heating plate 151 in the vertical direction, and a plurality of pin holes 154 may be provided.

The lift pin 153 may be moved in the vertical direction by a lifting mechanism (not illustrated). The lift pin 153 may allow the substrate W to be seated on the heating plate 151. The lift pin 153 may lift the substrate W to a position spaced apart from the heating plate 151 by a predetermined distance.

The cover 155 may be positioned above the heating plate 151, and may be provided in a shape conforming to the heating plate 151. The shape of the cover 155 may be variously modified as necessary. The cover 155 may provide a heating space therein.

The cover 155 may be moved in the vertical direction toward the heating plate 151 by the actuator 165 when the substrate W is transferred to the heating plate 151. The cover 155 may be moved downwards by the actuator 165 to form the heating space in which the substrate W is heated when the substrate W is heated by the heating plate 151.

The actuator 165 may be coupled to the cover 155 by a support 161. The actuator 165 may vertically lift and lower the cover 155 when the substrate W is transferred to or returned from the heating plate 151. For example, the actuator 165 may be provided as a cylinder.

The temperature control plate 156 may be positioned below the heating plate 151 so as to be spaced apart therefrom, and may have a gas discharge flow path 157 for discharging gas toward a lower surface of the heating plate 151 to control the temperature of the heating plate 151. As an example, the temperature control plate 156 may selectively discharge heated air or cooled air to raise, maintain, or lower the temperature of the heating plate 151.

The chilling unit 200 may cool the heating plate 151 or the processed substrate W. The chilling unit 200 may be disposed inside the transfer plate 131, or the transfer plate 131 may be included as one configuration of the chilling unit 200. In the present embodiment, a chilling plate 210 of the chilling unit 200 and the transfer plate 131 may be the same configurations, and an upper portion of the chilling plate 210 of the chilling unit 200 may function as the transfer plate 131.

Depending on situations, the chilling plate 210 of the chilling unit 200 may be configured separately from the transfer plate 131, and the chilling unit 200 may be disposed on a lower surface of the transfer plate 131.

The controller 300 may control operations of the transfer unit 130, the heating unit 150, the chilling unit 200, and the like.

With respect to the chilling unit 200, a description will be given with reference to an embodiment of a chilling unit 200 according to the present disclosure illustrated in FIGS. 4A and 4B.

The chilling unit 200 may include a chilling plate 210, a refrigerant flow path 220, a heat exchange medium, and the like.

The chilling plate 210 of the chilling unit 200 may function as the transfer plate 131 of the transfer unit 130, and may have the refrigerant flow path 220 therein. Here, an upper surface of the chilling plate 210 may function as the transfer plate 131.

The refrigerant flow path 220 may be formed in a zigzag shape inside the chilling plate 210 to pass through the entire area of the chilling plate 210.

The chilling unit 200 may include an actuating means (not illustrated) for moving the chilling plate 210 in the horizontal direction and the vertical direction. As an example, the arm 132 and the actuating member 137 of the transfer unit 130 may function as the actuating means of the chilling unit 200.

A refrigerant supplied through a refrigerant supplier (not illustrated) may flow in the refrigerant flow path 220. As the refrigerant, cooling water may be used as an example, and various types of refrigerant may be used as necessary.

The heat exchange medium may include a cooling pin 230 and a ball plunger 240.

A plurality of cooling pins 230 may be distributedly arranged on a lower surface of the chilling plate 210 of the chilling unit 200. The cooling pins 230 may be made of a material having a predetermined level of high thermal conductivity. The cooling pins 230 may pass through the lower surface of the chilling plate 210 so that an upper portion of each of the cooling pins 230 partially protrudes into the refrigerant flow path 220 to make direct contact with the refrigerant flowing in the refrigerant flow path 220.

The ball plunger 240 may be provided at a lower end of each of the cooling pins 230. The ball plunger 240 may be made of a material having a predetermined level of high thermal conductivity and having elasticity.

The actuating means of the chilling unit 200 may move the chilling plate 210 to above the heating plate 151 and then lower the chilling plate 210, and the ball plunger 240 provided at the end of each of the cooling pins 230 may be brought into contact with the heating plate 151.

By heat exchange through the configuration of the chilling unit 200, the temperature of the heating plate 151 may be effectively lowered within a short period of time.

Furthermore, a predetermined distance may be secured between the chilling plate 210 and the heating plate 151 through the cooling pins 230 and the ball plunger 240. Thus, it is possible to cool the heating plate 151 through the chilling unit 200 even in a situation in which the lift pin 153 protrudes on the heating plate 151.

Figure 5A:
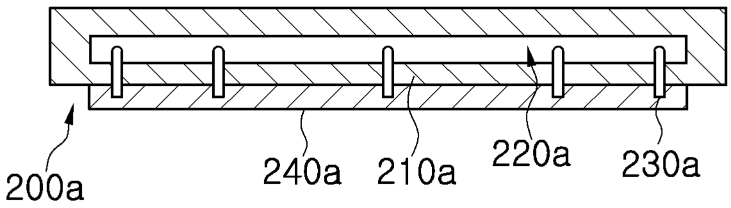
FIGS. 5A and 5B are views illustrating another embodiment of a chilling unit according to the present disclosure.
Figure 5B:
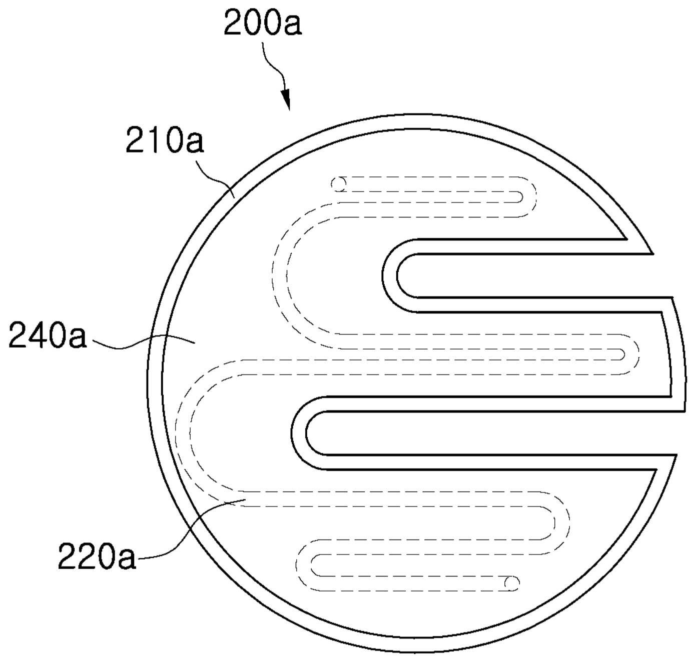

FIGS. 5A and 5B are views illustrating another embodiment of a chilling unit 200*a* according to the present disclosure.

Figure 4A:
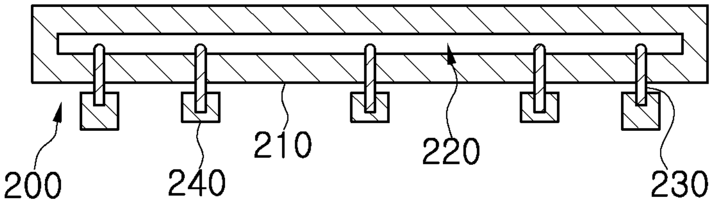
FIGS. 4A and 4B are views illustrating an embodiment of a chilling unit according to the present disclosure.
Figure 4B:
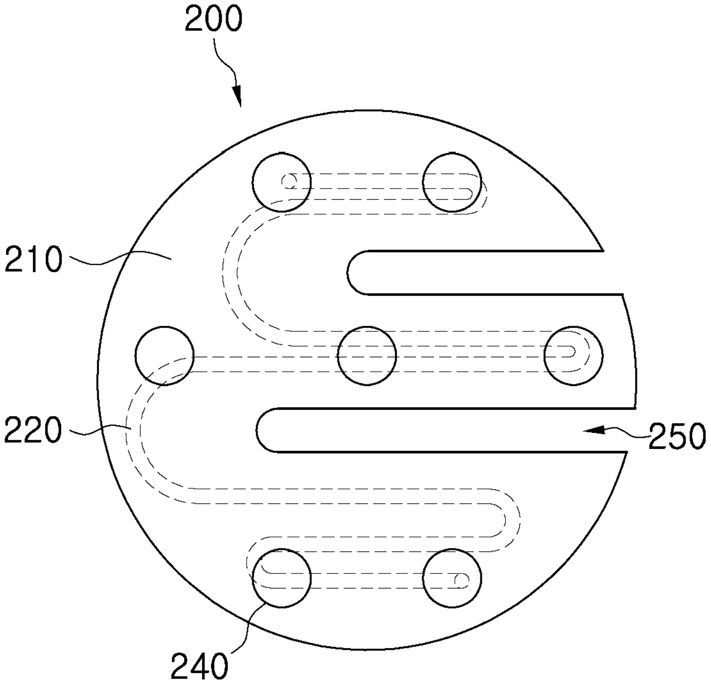

The chilling unit 200*a* according to the embodiment illustrated in FIGS. 5A and 5B may include a chilling plate 210*a*, a refrigerant flow path 220*a*, a heat exchange medium, and the like as in the case of the chilling unit 200 according to the embodiment illustrated in FIGS. 4A and 4B.

The heat exchange medium of the chilling unit 200*a* according to the embodiment illustrated in FIGS. 5A and 5B may be configured differently from the heat exchange medium of the chilling unit 200 according to the embodiment illustrated in FIGS. 4A and 4B.

The heat exchange medium may include a cooling pin 230*a*, a heat conduction pad 240*a*, and the like.

Each cooling pin 230*a* may be made of a material having high thermal conductivity, and may be disposed on a lower surface of the chilling plate 210*a* of the chilling unit 200*a*. The cooling pin 230*a* may pass through the lower surface of the chilling plate 210*a* so that an upper portion of the cooling pin 230*a* protrudes into the refrigerant flow path 220*a* to make direct contact with a refrigerant flowing in the refrigerant flow path 220*a*.

The heat conduction pad 240*a* may be provided in contact with the lower surface of the chilling plate 210*a*. The heat conduction pad 240*a* may be made of a material having high thermal conductivity and elasticity.

The heat conduction pad 240*a* may be provided in a shape conforming to the lower surface of the chilling plate 210*a* so as to cover the entire lower surface of the chilling plate 210*a*. Depending on situations, the heat conduction pad 240*a* may have a predetermined area, and a plurality of heat conduction pads 240 may be provided to be distributed over a plurality of areas on the lower surface of the chilling plate 210*a*.

A lower portion of the cooling pin 230*a* may be inserted into an upper surface of the heat conduction pad 240*a* to enable more efficient heat exchange between the heat conduction pad 240*a* and the refrigerant flowing in the refrigerant flow path 220*a*.

An actuating means of the chilling unit 200*a* may move the chilling plate 210*a* to above a heating plate 151 and then lower the chilling plate 210, so that the heat conduction pad 240*a* provided on the lower surface of the chilling plate 210*a* may be brought into contact with the heating plate 151.

By heat exchange through the configuration of the chilling unit 200*a*, the temperature of the heating plate 151 may be effectively lowered in a short period of time.

In addition, the present disclosure provides a heat treatment method using the chilling unit and heat treatment apparatus according to the present disclosure as described above. Hereinafter, the heat treatment method according to the present disclosure will be described through embodiments.

Figure 6:
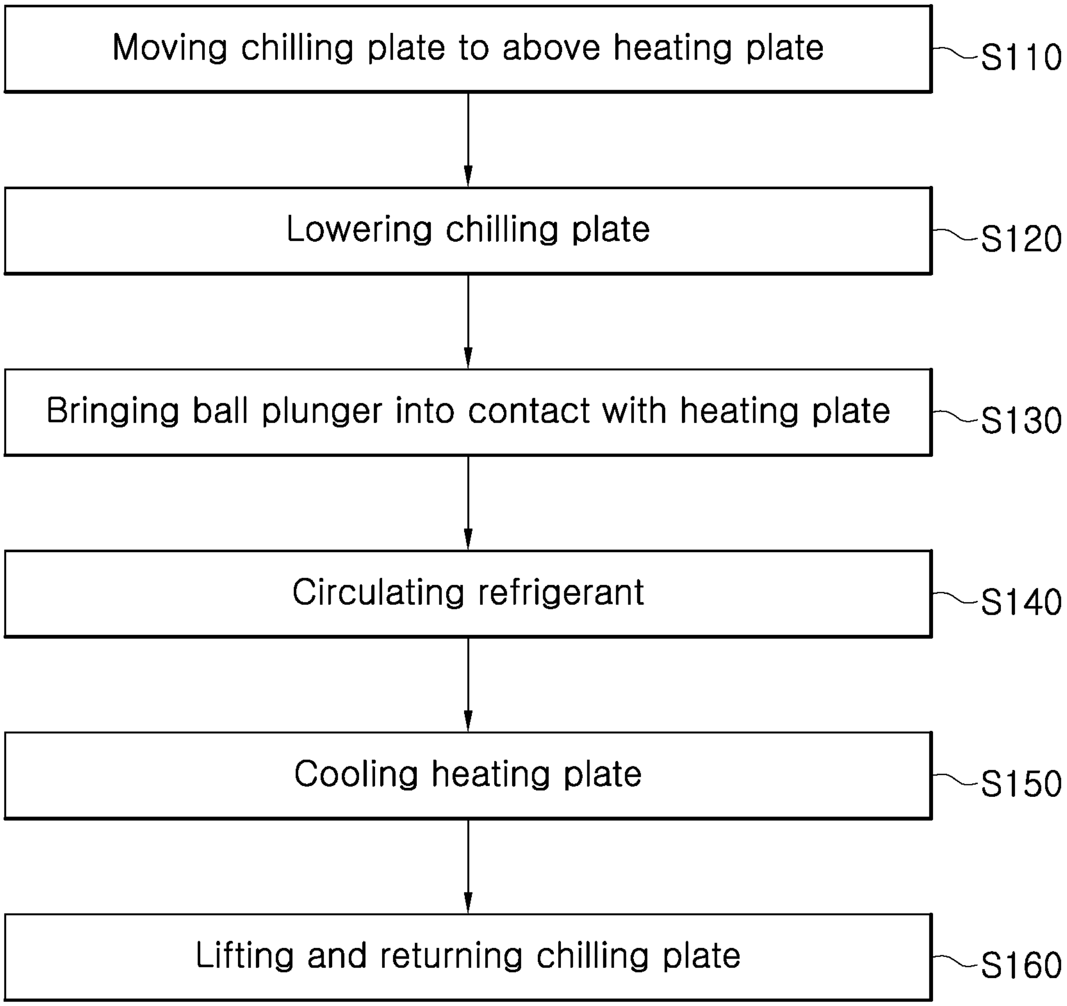
FIG. 6 is a flowchart illustrating an embodiment of a heat treatment method according to the present disclosure.

FIG. 6 is a flowchart illustrating an embodiment of a heat treatment method according to the present disclosure. FIGS. 7A to 10 are views illustrating an example of a process of performing the heat treatment method according to the present disclosure.

In a state in which the temperature of a heating plate 151 is increased to equal to or higher than a predetermined level after performing a heat treatment process on a substrate W through a heating unit 150 of a heat treatment apparatus 100, when there is a need to rapidly lower the temperature of the heating plate 151 to perform the next processing process, the heating plate 151 of the heating unit 150 may be cooled through a chilling unit 200.

To this end, a chilling plate 210 of the chilling unit 200 may be moved to above the heating plate 151 (S110).

The chilling plate 210 may be moved to a corresponding position above the heating plate 151, after which the chilling plate 210 may be lowered toward an upper surface of the heating plate 151 (S120).

Figure 7A:
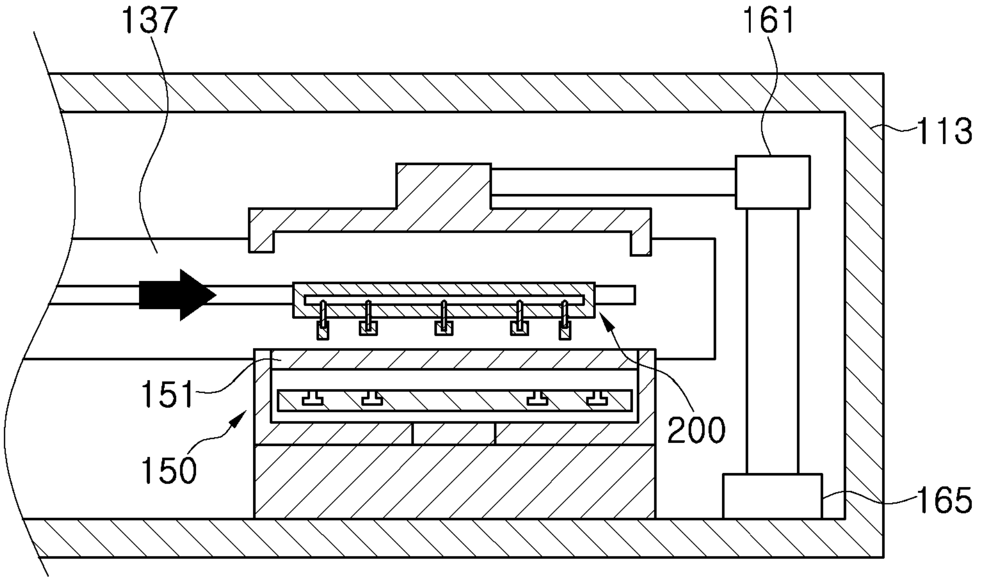
FIGS. 7A, 7B, and 8 to 10 are views illustrating an example of a process of performing the heat treatment method according to the present disclosure.
Figure 7B:
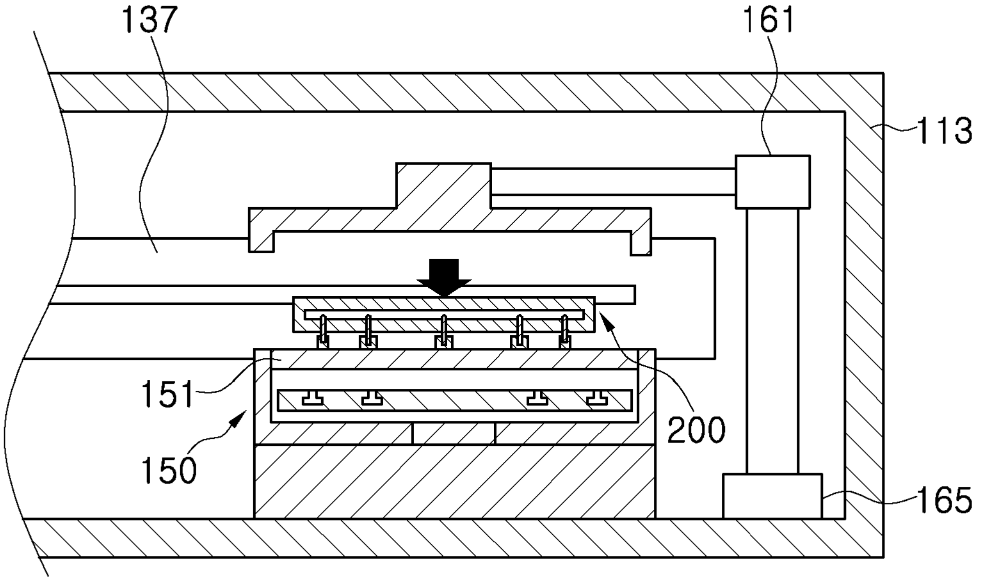

As illustrated in FIGS. 7A and 7B, after the chilling plate 210 is horizontally moved to above the heating plate 151 through an actuating member 137, the chilling plate 210 may be lowered from a position corresponding to the upper surface of the heating plate 151.

Figure 8:
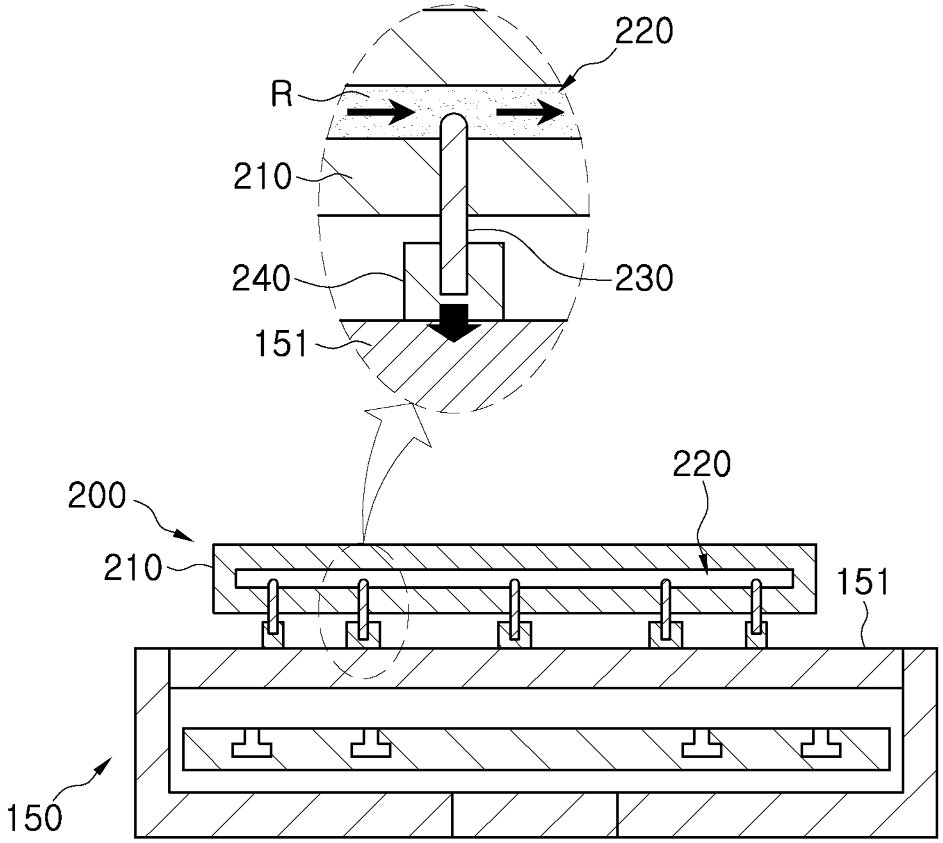

Furthermore, as illustrated in FIG. 8, after each ball plunger 240 as one configuration of a heat exchange medium of the chilling unit 200 is brought into contact with the upper surface of the heating plate 151, in order to enable the entire ball plunger 240 to be uniformly pressurized in contact with the upper surface of the heating plate 151, the chilling plate 210 of the chilling unit 200 may be further lowered.

Figure 9:
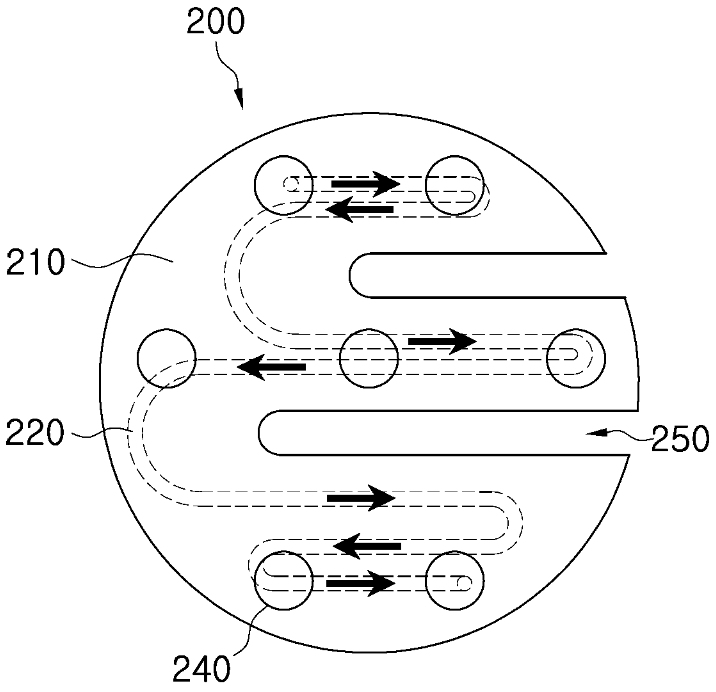

In a state in which the ball plunger 240 is uniformly in contact with the upper surface of the heating plate 151, as illustrated in FIG. 9, a refrigerant R may be supplied to a refrigerant flow path 220 of the chilling unit 200 to circulate the refrigerant R in the refrigerant flow path 220 (S140). Here, as the refrigerant, various cooling materials may be used. As an example, cooling water may be used.

As the refrigerant R circulates in the refrigerant flow path 220, heat exchange may be performed between the refrigerant R and the heating plate 151 in contact with the ball plunger 240 through each cooling pin 230 of the chilling unit 200 to cool the heating plate 151 (S150).

Figure 10:
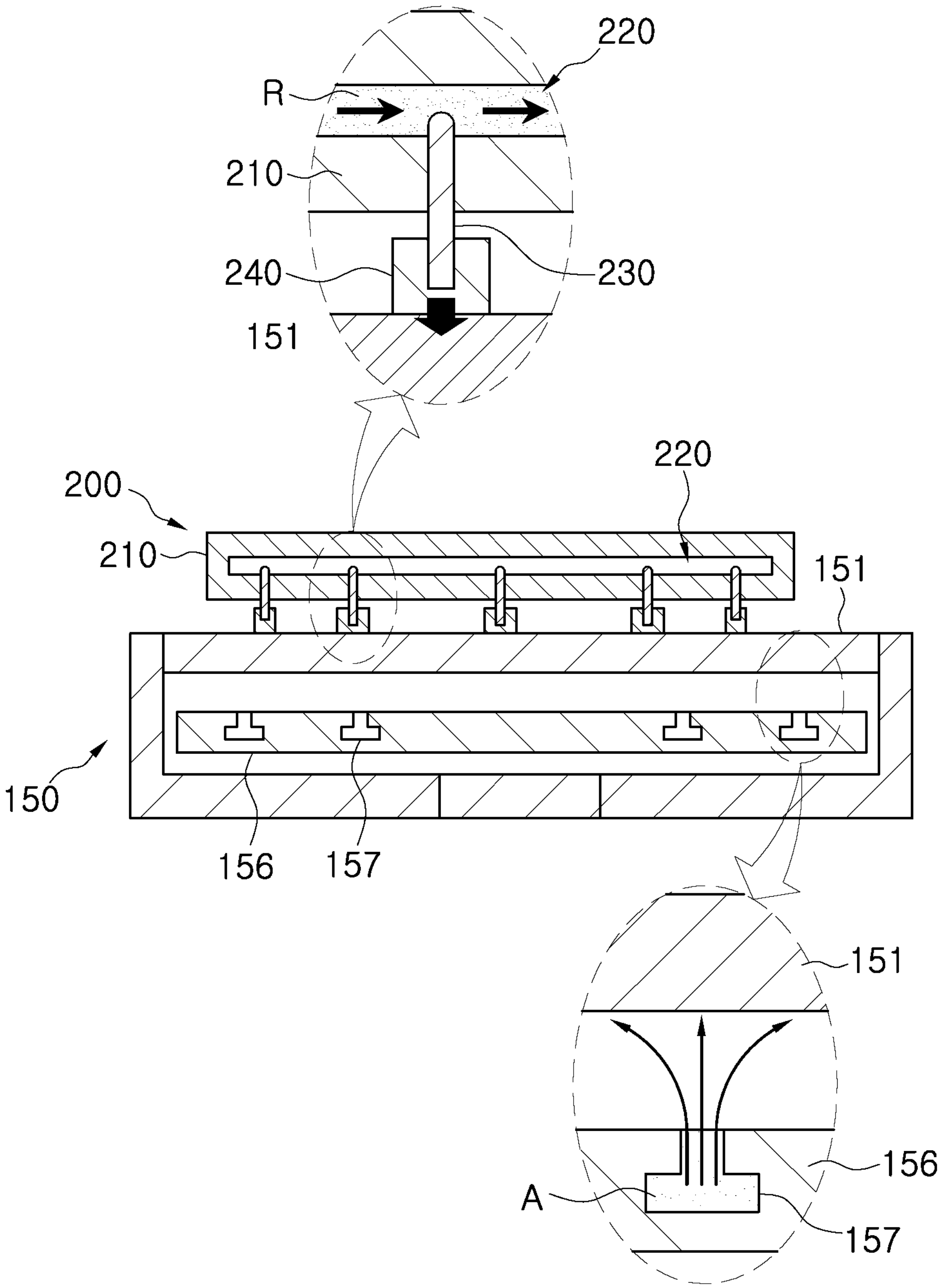

Furthermore, as illustrated in FIG. 10, while a cooling process is performed by bringing the chilling unit 200 into contact with the upper surface of the heating plate 151, a cooling gas A such as cooled air may be supplied through a gas discharge flow path 157 of a temperature control plate 156 disposed under the heating plate 151, thereby more effectively lowering the temperature of the heating plate 151.

Then, when the temperature of the heating plate 151 is lowered to a set level, the chilling plate 210 may be lifted and returned to an original position thereof (S160) to terminate the cooling process for the heating plate 151.

In this embodiment, the heat treatment method has been described using the chilling unit to which the ball plunger illustrated in FIGS. 4A and 4B is applied. However, the present disclosure is not limited thereto, and the heat treatment method according to the present disclosure may also be performed through the chilling unit to which the heat conduction pad illustrated in FIGS. 5A and 5B is applied.

By performing the heat treatment method according to the present disclosure as described above, it is possible to effectively cool the heating plate within a short period of time.

According to the present disclosure as described above, by enabling heat exchange between the refrigerant and the heating plate to be performed more effectively, it is possible to lower the temperature of the heating plate within a short period of time, thereby significantly increasing the operating rate of the entire facility.

In particular, while securing substantial contact force and contact area with the heating plate through the ball plunger or the heat conduction pad with high thermal conductivity and elasticity, the cooling pin performs heat exchange in direct contact with the refrigerant. Thus, it is possible to further increase the cooling rate of the heating plate.

Furthermore, a predetermine distance may be secured between the chilling plate and the heating plate through the cooling pin and the ball plunger. Thus, it is possible to cool the heating plate through the chilling unit even in a situation in which the lift pin protrudes on the heating plate.

The above description is only an example describing a technological scope of the present disclosure. Various changes, modifications, and replacements may be made by those skilled in the art without departing from the spirit and scope of the present disclosure. Therefore, the embodiments disclosed above and in the accompanying drawings should be considered in a descriptive sense only and not for limiting the technological scope. The technological scope of the present disclosure is not limited by the embodiments and the accompanying drawings. The spirit and scope of the present disclosure should be interpreted by the appended claims and encompass all equivalents falling within the scope of the appended claims.

What is claimed is:

1. A heat treatment apparatus comprising:

a chilling unit comprising:

a chilling plate configured to be moved toward a heating plate of a heating unit configured to perform a heat treatment process on a substrate;

a refrigerant flow path provided in the chilling plate and configured to allow a refrigerant to flow therethrough; and a heat exchange medium configured to cool the heating plate in contact with at least a portion of the heating plate through heat exchange between the heating plate and the refrigerant in the refrigerant flow path, wherein the heat exchange medium comprises a cooling pin disposed on a lower surface of the chilling plate and having a predetermined level of thermal conductivity.

2. The heat treatment apparatus of claim 1, wherein the cooling pin is configured such that an upper portion of the cooling pin partially protrudes into the refrigerant flow path to make direct contact with the refrigerant flowing in the refrigerant flow path.

3. The heat treatment apparatus of claim 1, wherein the heat exchange medium further comprises a ball plunger in which a lower portion of the cooling pin is partially inserted and configured to make contact with the heating plate.

4. The heat treatment apparatus of claim 3, wherein the ball plunger is made of a material having a predetermined level of thermal conductivity and having elasticity.

5. The heat treatment apparatus of claim 1, wherein the heat exchange medium further comprises a heat conduction pad in which a lower portion of the cooling pin is inserted and configured to make contact with the heating plate.

6. The heat treatment apparatus of claim 5, wherein the heat conduction pad is made of a material having a predetermined level of thermal conductivity and having elasticity.

7. The heat treatment apparatus of claim 5, wherein the heat conduction pad is formed with an area corresponding to a shape of the lower surface of the chilling plate.

8. The heat treatment apparatus of claim 5, wherein the heat conduction pad is formed with a predetermined area, the heat conduction pad comprises a plurality of heat conduction pads, and the plurality of heat conduction pads are distributed on the lower surface of the chilling plate.

9. The heat treatment apparatus of claim 1, further comprising an actuating means configured to move the chilling plate in horizontal and vertical directions to bring the heat exchange medium into contact with the heating plate.

10. The heat treatment apparatus of claim 1, further comprising:

a housing providing an inner space in which the heat treatment process is performed on the substrate;

the heating unit disposed in the inner space of the housing and configured to perform the heat treatment process by heating the substrate to a set temperature;

a transfer unit configured to transfer the substrate in the inner space of the housing; and a controller configured to control operation of the heating unit, the transfer unit, and the chilling unit.

11. The heat treatment apparatus of claim 10, wherein the heating unit comprises:

the heating plate in which a heating means is disposed and configured to perform the heat treatment process on the substrate; and a cover positioned above the heating plate and configured to be movable in a vertical direction toward the heating plate to provide a heating space.

12. The heat treatment apparatus of claim 11, wherein the heating unit further comprises a temperature control plate positioned below the heating plate so as to be spaced apart from the heating plate, and configured to discharge gas toward a lower surface of the heating plate.

13. The heat treatment apparatus of claim 10, wherein the transfer unit comprises:

a transfer plate configured to allow the substrate to be seated thereon;

an arm connected to a side of the transfer plate; and an actuating member configured to move the arm to move the transfer plate in horizontal and vertical directions.

14. The heat treatment apparatus of claim 13, wherein the chilling plate of the chilling unit is integrated with the transfer plate of the transfer unit.

15. The heat treatment apparatus of claim 13, wherein the chilling unit is disposed on a lower surface of the transfer plate of the transfer unit.

* * * * *